Figures 1, 2:
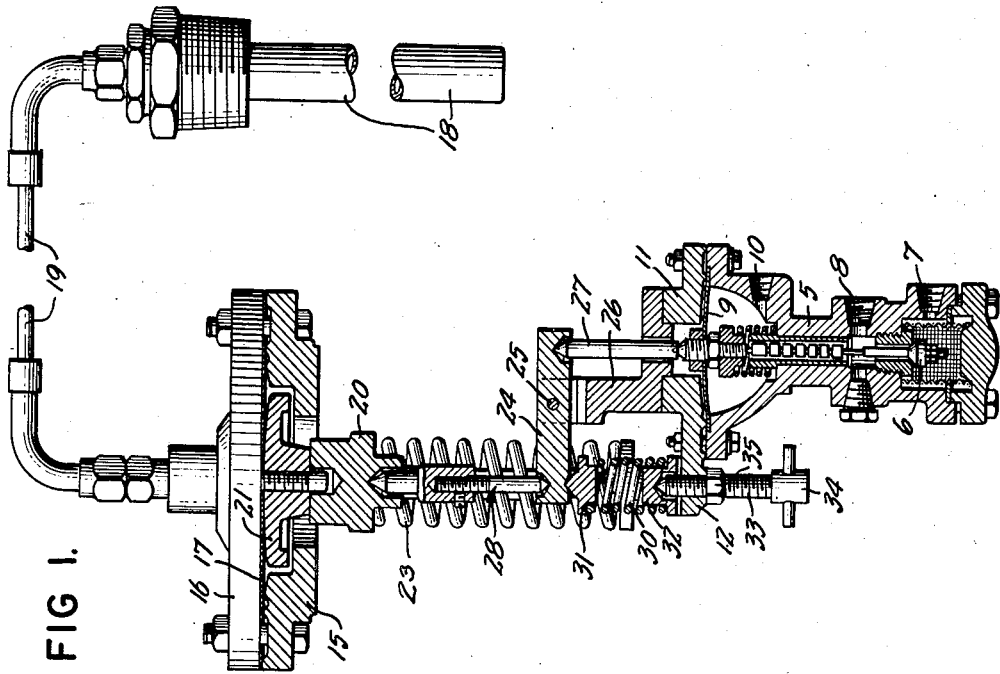

April 22, 1958

P. SPENCE 2,831,639

TEMPERATURE PILOT VALVE

Filed Dec. 21, 1953

INVENTOR
*PAULSEN SPENCE*
BY
*Mitchell T Bechert*
ATTORNEYS

United States Patent Office 2,831,639
Patented Apr. 22, 1958

2,831,639

TEMPERATURE PILOT VALVE

Paulsen Spence, Baton Rouge, La.

Application December 21, 1953, Serial No. 399,222

2 Claims. (Cl. 236—86)

My invention relates to an automatic temperature-control device.

It is an object of the invention to provide an improved construction of the character indicated.

It is another object to provide an improved fluid-pressure-operated temperature-control mechanism with improved means for selectively determining the temperature of operation thereof.

It is a further object to provide a device meeting the above objects and inherently characterized by an extended range of adjustable operation.

Other objects and various further features of novelty and invention will be pointed out or will occur to those skilled in the art from a reading of the following specification in conjunction with the accompanying drawings. In said drawings, which show, for illustrative purposes only, a preferred form of the invention:

Fig. 1 is a view primarily in vertical section and illustrating parts of a temperature control device incorporating features of the invention; and Fig. 2 is a left side view in elevation of parts shown in Fig. 1.

Briefly stated, my invention contemplates an improved temperature-regulating device in which, by simple manual adjustment of the stress in an auxiliary spring, the control point for operation of the mechanism may be readily adjusted over an extended range of operation. The mechanism is shown in application to a temperature-control pilot valve for controlling the supply of control-pressure fluid to a main steam or other heating valve.

Referring to the drawings, my invention is shown in application to a temperature-control pilot valve comprising a body 5 containing a valve member 6, for controlling the flow of control-pressure fluid between an inlet 7 and an outlet 8. The pilot valve 6 is to be moved in accordance with a control pressure which may reflect not only the pressure in the main heating-fluid-supply line, but also the delivered or controlled temperature, representing actual heat detected at the radiator, chamber, vat or other device being heated. The pilot valve may thus include fluid-pressure-actuated means such as a diaphragm 9, the underside of which is subjected through port 10 to a control pressure; the control pressure for supply at 10 may be derived from the main supply line for the heating fluid. Temperature-responsive actuation of the pilot valve 6 may be combined with the pressure-responsive function by mechanical means to be described.

In accordance with a feature of the invention, the temperature-responsive means for controlling pilot valve 6 may be directly and compactly carried by the body 5, and in the form shown I provide a bonnet or cowl 11 having an integral offset or bracket 12 for this purpose. The bracket 12 is shown carrying spaced standards 13—14 for the rigid support of a thermostat assembly, comprising a base 15 and a cowl or a bonnet 16, with flexible diaphragm means 17 clamped therebetween. The thermostat assembly may further include a bulb 18 connected by flexible means 19 to the pressure-actuated side of diaphragm 17 and the space over diaphragm 17 and within means 18—19 may be filled with a temperature expansive gas.

Normally, it is desirable to employ spring-loading means acting between the bonnet 11 and the diaphragm 17 in order to oppose pressure-actuated movement of the diaphragm 17. For this purpose, I show a yoke 20 guided between standards 13—14 and connected directly to a pressure plate or button 21 acting on the diaphragm 17. Adjusting nuts 22 on the standards 13—14 may serve for a rough setting of the normal biasing or load force of springs 23 on the yoke 20.

In order to connect the temperature-responsive diaphragm 17 to the otherwise purely pressure-responsive diaphragm 9, I employ a lever 24 pivoted, as at clevis pin 25, to an upstanding bracket 26, which may be formed as a part of or carried by the bonnet or cowl 11. A stem member 27 aligned with the valve 6 connects one end of lever 24 to the diaphragm 9, and stem means 28 aligned with the center of diaphragm 17 connects the other end of lever 24 to the yoke 20 and, therefore, to the diaphragm 17. For fine-adjustment purposes, I employ auxiliary spring means, such as the coil spring 30 located preferably between the loading springs 23 and in axial alignment with the stem 28 and diaphragm 17. For frictionless connection of the spring 30, regardless of the angular position of lever 24, a button 31 may accommodate one end of the spring 30 and provide a central point contact with the lever 24. In like manner, the other end of spring 30 may be seated on a further button 32 recessed to accommodate the pointed end of an adjusting screw 33; screw 33 may be actuated by exposed manual means 34. A lock nut 35 may serve to secure a given selected adjustment of the auxiliary spring 30.

In operation, the valve 6 will function in accordance with the automatic evaluation of the supply-line pressure, as observed on the fluid-pressure actuated side of diaphragm 9, and of the delivered temperature, as observed by bulb 18 in conjunction with diaphragm 17. If the system is cold, then the springs 23—30 will have set the pilot valve 6 in the open position, in readiness to supply control pressure for opening the main valve (not shown). However, if the initial supply of heating fluid should be at too great pressure, diaphragm 9 will be actuated to reduce the supply of control pressure to the main valve, thus avoiding an excessive rush of live steam to the equipment being heated. As the system nears the desired regulating temperature, diaphragm 17 will be actuated to relieve the force of springs 23—30 on diaphragm 9, thus closing the pilot valve 6. Adjustments of the operating point may be readily made merely by loosening the lock nut 35 and manually setting the compression of auxiliary spring 30. The force exerted by spring 30 compared to that exerted by springs 33 may be relatively small and yet the range of temperature control may extend beyond that available with previous constructions. Furthermore, this extended range of adjustment is available with a compactness not previously available.

While I have described my invention in detail for the preferred form shown, it will be understood that modifications may be made within the scope of the invention as defined in the claims which follow.

I claim:

1. A combined pressure-temperature pilot valve comprising a body, a pilot-valve member movable to open and close said valve, fluid-pressure-actuated means coacting with said body and responsive to fluid pressure to actuate said valve member, a pneumatic thermostat comprising a flexible diaphragm, vapor-tension means for moving said diaphragm in one direction, standard means supporting said diaphragm on said body, two spaced springs supported by said body and acting symmetrically on said diaphragm in a direction opposing vapor-tension-actuated movement of said diaphragm, means for selectively adjusting the force of said springs, a rocking lever pinned to said body, stem means in direct force-transmitting relation between said diaphragm and said lever on one side of the pin, stem means in direct force-transmitting relation between said fluid-pressure-actuated means and said lever on the other side of the pin, auxiliary spring means acting directly on said lever in alignment with one of said stem means and in the direction opposing fluid-pressure-actuated movement of said valve member, and means for selectively adjusting the force of said auxiliary spring means.

2. A combined pressure-temperature pilot valve comprising a body, a pilot-valve member movable to open and close said valve, fluid-pressure-actuated means co-acting with said body and responsive to fluid pressure to actuate said valve member, a bonnet overstanding said fluid-pressure-actuated means, standard means carried by said bonnet and offset from the thrust axis of said fluid-pressure-actuated means, a thermostat including a flexible diaphragm supported by said standard means and having a thrust axis generally parallel to but offset from that of said fluid-pressure-actuated means, a rocking lever pinned to said bonnet on a rocking axis between said thrust axes, a first stem on said first thrust axis and in direct force-transmitting relation between one end of said lever and said fluid-pressure-actuated means, a second stem on said second thrust axis and in direct force-transmitting relation between the other end of said lever and said diaphragm, spring means acting between said standard means and said diaphragm and symmetrically with respect to the stem connection to said diaphragm, auxiliary spring means acting on said lever symmetrically with respect to one of said stem means and in the direction opposing fluid-pressure-actuated movement of said valve member, and separate means for selectively adjusting the force of both said spring means.

References Cited in the file of this patent

UNITED STATES PATENTS

| | | |
|---|---|---|
| 554,398 | Powers | Feb. 11, 1896 |
| 1,186,180 | Fulton | June 6, 1916 |
| 1,870,895 | Carson | Aug. 9, 1932 |
| 2,040,109 | Spence | May 12, 1936 |
| 2,151,541 | Waddell | Mar. 21, 1939 |
| 2,231,696 | Wolfe | Feb. 11, 1941 |
| 2,305,429 | Johnson | Dec. 15, 1942 |